Figure 1:
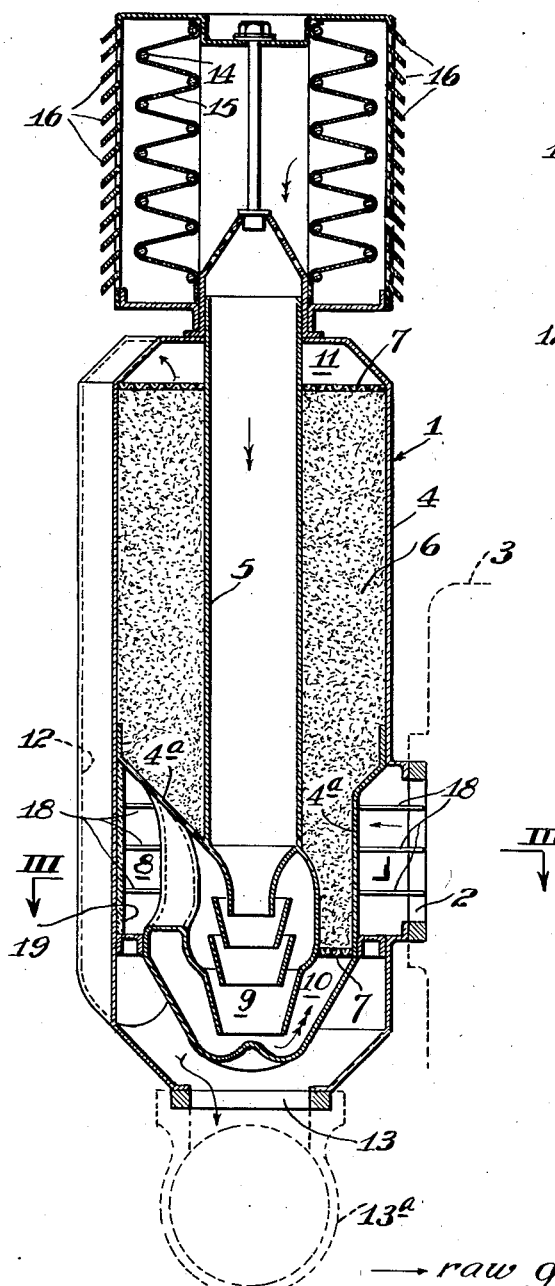

Jan. 3, 1933.   C. J. KRYZANOWSKY   1,893,372
APPARATUS FOR TREATING EXHAUST GASES OF INTERNAL COMBUSTION ENGINES
Original Filed Jan. 11, 1929   3 Sheets-Sheet 1

→ raw gas
→ air
→ air + raw gas
→ treated gas

WITNESSES
A. B. Wallace
J. R. Flick

INVENTOR
Constant J. Kryzanowsky
by Brown + Critchlow
his attorneys

Jan. 3, 1933.  C. J. KRYZANOWSKY  1,893,372
APPARATUS FOR TREATING EXHAUST GASES OF INTERNAL COMBUSTION ENGINES
Original Filed Jan. 11, 1929   3 Sheets-Sheet 2
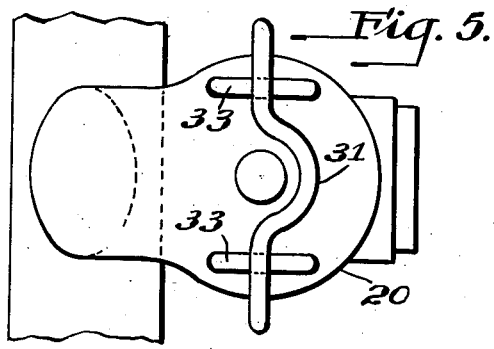
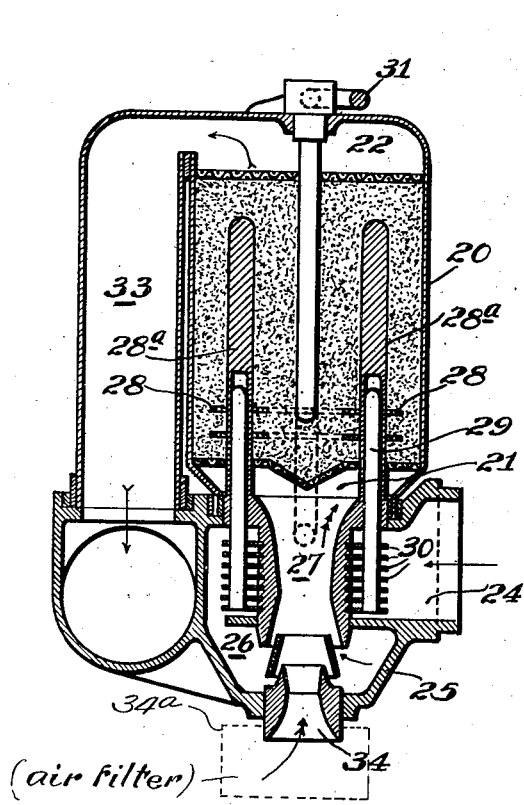
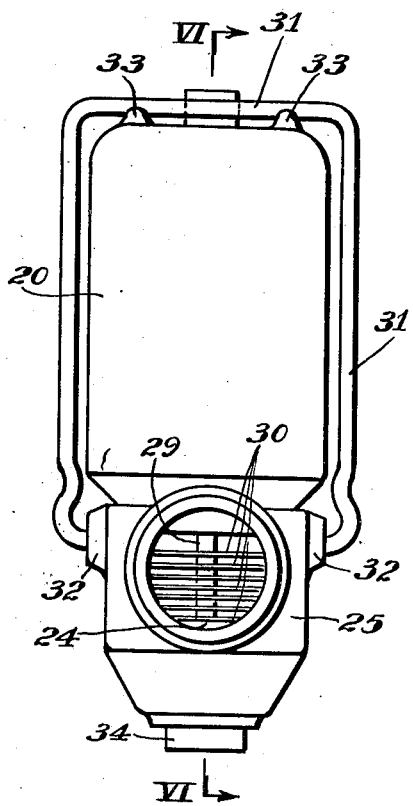
WITNESSES
INVENTOR Jan. 3, 1933.   C. J. KRYZANOWSKY   1,893,372
APPARATUS FOR TREATING EXHAUST GASES OF INTERNAL COMBUSTION ENGINES
Original Filed Jan. 11, 1929   3 Sheets-Sheet 3

WITNESSES

INVENTOR
Constant J. Kryzanowsky
by Brown + Critchlow
his attorneys.

Patented Jan. 3, 1933

1,893,372

UNITED STATES PATENT OFFICE

CONSTANT J. KRYZANOWSKY, OF BALTIMORE, MARYLAND, ASSIGNOR TO MINE SAFETY APPLIANCES COMPANY, OF PITTSBURGH, PENNSYLVANIA, A CORPORATION OF PENNSYLVANIA, AND H. J. NEWMARK, OF NEW YORK, N. Y.

APPARATUS FOR TREATING EXHAUST GASES OF INTERNAL COMBUSTION ENGINES

Application filed January 11, 1929, Serial No. 331,868. Renewed May 13, 1932.

This invention relates to apparatus for purifying gas of combustion by elimination of objectionable constituents, and especially to apparatus for treating internal combustion engine exhaust gas to catalytically convert the toxic and malodorous constituents of the gas into innocuous and odorless compounds.

Of the toxic gases, carbon monoxide is one of the most deadly, because of its insidious nature. This gas has neither odor, taste, nor color, it produces no startling effects when breathed, and lethal amounts can usually be inhaled and combined with blood hemoglobin before the person exposed develops any other symptom than a feeling of drowsiness. Carbon monoxide is responsible for numerous fatalities, which most frequently are due to breathing of internal combustion engine exhaust gas, which commonly contain relatively large amounts of this toxic substance. Such gas may, for example, leak into spaces occupied by industrial workers, or into closed automobiles. Also, a common source is that of running automobile engines in closed garages with insufficient ventilation. While some of these instances of poisoning are inadvertent, they are usually due to ignorance of or carelessness with respect to the danger. Automobile and similar exhaust gas is also objectionable because of their disagreeable odor, due largely to unburned fuel and oil together with decomposition products of those materials.

An object of the invention is to provide apparatus for catalytically purifying exhaust gas of combustion, which is simple and efficient, which satisfactorily converts toxic constituents into innocuous substances, and in which the catalyst is indirectly heated by the heat contained in the incoming exhaust gas.

A further object is to provide apparatus of the type referred to which is light in weight and compact, is provided with means actuated by gas flow for supplying air to the gas, is provided with heat-exchanging means associated with the incoming gas and catalyst, is particularly adapted for use with internal combustion engines, and especially for installation in automotive vehicles, is automatic in operation, and which is readily replaceable if and when the catalyst ceases to function.

As used herein and in the claims with reference to exhaust gas, the term "purification" refers to the elimination of objectionable constituents from the gas, and especially to catalytic oxidation of carbon monoxide and other oxidizable toxic and malodorous substances.

Figure 3:
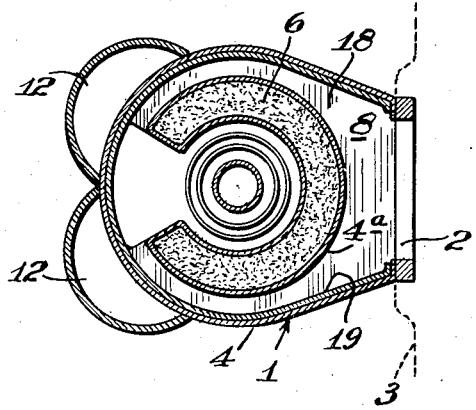
Figure 2:
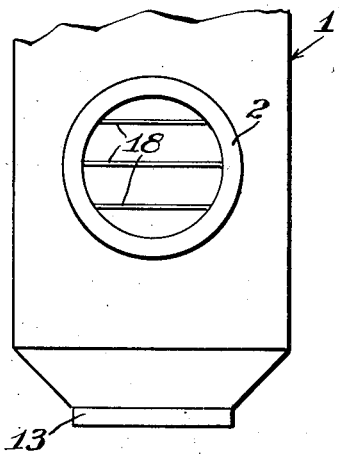
Figure 7:
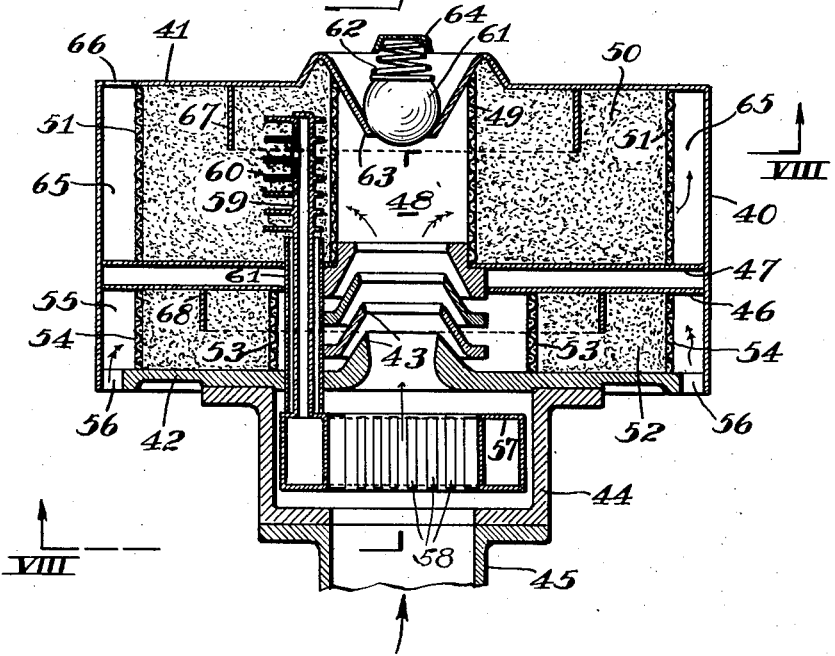

The invention is illustrated in the accompanying drawings, in which Fig. 1 is a longitudinal section through the preferred embodiment; Fig. 2 a partial side elevation of the apparatus shown in Fig. 1; Fig. 3 a cross section of the same apparatus taken on line III—III, Fig. 1; Fig. 4 a side elevation of a modified form of apparatus; Fig. 5 a top plan view of the apparatus shown in Fig. 4; Fig. 6 a longitudinal section of the apparatus shown in Fig. 4, taken on line VI—VI, Fig. 4; Fig. 7 a central sectional view of another embodiment of the invention; and Fig. 8 a view partly in section and partly in plan of the apparatus shown in Fig. 7, the section being taken on line VIII—VIII, Fig. 7.

The apparatus provided by this invention comprises a canister having a catalyst chamber provided with an inlet for incoming or raw gas, and an outlet for purified gas. An oxidizing catalyst is disposed in the canister in the path of the gas, means are provided for admixing air with the raw gas, and means are also provided for transferring heat from the incoming raw gas to the catalyst prior to its contact with the catalyst.

Although various means may be used for introducing air into the gas, it is preferred to pass the raw gas through an aspirating nozzle which entrains air by jet action and which draws in air in proportion to the flow of gas to the catalyst. The heating of the catalyst is accomplished by heat conducting means which absorbs heat from the incoming gas prior to its being mixed with air, and conducts it to the catalyst. Also, the apparatus is preferably provided with means for filtering the air drawn in through the nozzle, to prevent access of dust and dirt which might accumulate on the catalyst and impair its efficiency.

Referring now to the drawings, Figs. 1 to 3 show the preferred embodiment, which comprises a canister 1 having an intake 2 for connection to the exhaust of an internal combustion engine 3, indicated generally in dotted lines in Fig. 1. This connection may be made directly to the exhaust port of the engine, in which case one device is used for each cylinder, or for each port where two cylinders exhaust to a common port, or a single device may be interposed directly in the exhaust pipe to accommodate the gas from all cylinders of an engine. In the latter case it is preferred to make the connection as close as practicable to the engine.

The canister, which is preferably made from sheet metal and of generally cylindrical form, comprises an outer wall 4 and a central air duct 5, between which there is formed an elongated annular catalyst chamber open at both ends. An inner partition wall 4a adjacent intake 2 tapers toward duct 5, so that this end of the chamber is of decreasing cross sectional area. An oxidizing catalyst 6 is disposed in the chamber between end retaining screens 7.

Raw gas from intake 2 circulates in a passage 8 around the reduced portion of chamber 6, and passes into an aspirating nozzle 9 connected to the lower end of duct 5. This nozzle is preferably of the multi-stage type which entrains air by jet action. A chamber 10 formed around the discharge orifice of the nozzle causes the gas to change direction and pass upwardly through screen 7 and the catalyst into an annular space 11 at the top of the canister, and thence through ducts 12 to a discharge outlet 13 connected to a pipe 13a leading to any desired point.

The air duct is preferably provided with means for filtering air supplied thereto, one form of which is shown connected to the upper end of the duct. It comprises a skeleton framework of wire circles 14 of alternately large and small diameter, suitably supported, and covered exteriorly with a layer of filter cloth 15 stretched over the wires. The interior of the filter thus formed is connected to the air duct, as shown in Fig. 1. An outer vaned casing 16 protects the cloth from mechanical damage.

When in use, the hot exhaust gas entering passage 8 circulates around the tapered portion of the chamber and gives up a portion of its heat to the walls 4a, thus heating the catalyst in that portion. The gas then enters nozzle 9, entraining filtered air, and the raw gas-air mixture passes through the catalyst, where the carbon monoxide is converted to carbon dioxide, and other oxidizable constituents of the gases are catalytically and thermally acted upon. The purified gas enters chamber 11 and passes into ducts 12, leaving the apparatus from outlet 13.

The catalysts suitable for use in this apparatus begin to be active, or are most efficient, at somewhat elevated temperatures, and in order to drive off any condensed moisture and to bring them to operating temperature it is necessary to heat them when gas is first supplied after a period of inactivity. According to this invention, such heating is accomplished in the manner just explained, it being necessary usually to heat only a portion of the catalyst, because the reaction liberates enough heat to bring the balance of the catalyst up to operating temperature.

This conduction of heat to the catalyst, to indirectly heat it by the incoming gas, is necessary in most instances because when mixed with air the gas is cooled to a point where it is then incapable of heating the catalyst sufficiently. The heating may be, and preferably is, increased by heat conducting fins 18 arranged in conduit 8 and connected to walls 4a. It may be further increased by lining the outer wall of chamber 8 with a heat insulating material 19, which reduces conduction of heat outwardly from the chamber.

In the modification shown in Figs. 4 to 6, the catalyst is disposed in a canister 20 having an inlet 21 for raw gas and an outlet 22 for purified gas, screens being used as before when necessary. The raw gas enters through an intake 24 in a fitting 25, and circulates in a passage 26 around an aspirating nozzle 27 similar to that previously described, carried in fitting 25. The intake is connected to the exhaust of an engine not shown, and the gas passes from the nozzle into inlet 21 of the canister.

A series of parallel metallic plates 28 embedded in the catalyst adjacent inlet 21 are mounted in spaced relation upon a plurality of tubular members 28a which are connected at their lower ends to the fitting which forms the discharge end of nozzle 27, as shown in Fig. 6. These members receive metallic or other heat conducting rods 29 connected at their lower ends to a plurality of fins 30 arranged in conduit 26. The rods make a sliding fit with the tubes, and heat absorbed by the fins from hot gas entering the conduit is conducted by the rods to the plates in the catalyst. This heats the catalyst to operating temperature, as in the preceding modification.

The canister and fitting are clamped together by a U-shaped spring rod 31 pivotally mounted in studs 32 formed on the fitting, which rod yieldingly engages grooved projections 33 formed on the canister to hold these members in gas-tight relation, but permits ready removal of the canister should it be necessary to renew the catalyst.

The purified gas passes from outlet 22 into a duct 33 leading to any desired point. An air filter 34a, which may be of the form previously described, may be suitably connected to the air intake side 34 of the nozzle.

Figure 8:
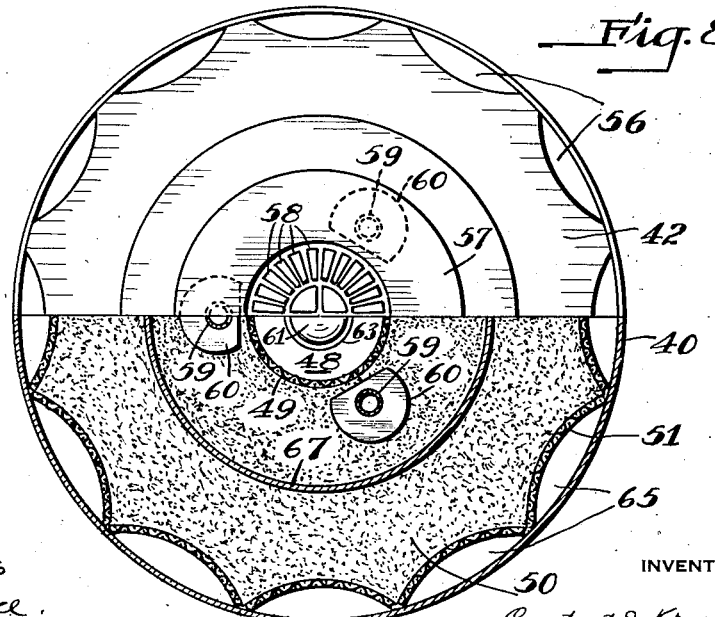

Another form of apparatus which is particularly adapted for use with single cylinder stationary engines is shown in Figs. 7 and 8. It comprises a canister having a cylindrical shell 40 having a top and bottom 41 and 42, respectively. A multi-stage aspirating nozzle 43 carried by bottom 42 is connected externally through a sleeve 44 to an exhaust 45 of an internal combustion engine. The nozzle extends through spaced partition walls 46 and 47 and discharges into a space 48 formed by a longitudinally disposed cylindrical screen 49 which extends from partition 47 to top 41. A bed 50 of an oxidizing catalyst is supported between screen 49 and another screen 51 spaced from shell 40.

The entraining orifices of nozzle 43 lie in a space formed between partition 46 and bottom 42, and air is supplied to the nozzles through a bed 52 of a filtering medium supported laterally between screens 53 and 54, the latter being spaced from the shell to form an air passage 55 into which air passes from peripherally disposed inlets 56 formed in bottom 42.

The heating means shown in this modification comprises a tubular ring 57 disposed within sleeve 44, and provided with radially disposed heat absorbing fins 58. Extending upwardly from the ring through the air filter and into the catalyst are a plurality of tubes 59, closed at their extended ends and provided with parallel fins 60 embedded in the catalyst. These tubes are arranged to lie adjacent to screen 49, and where they pass through the filter they are insulated by a lagging 61. A heat exchanging substance is placed inside of ring 57 to absorb heat taken up from the gas by fins 58, and to conduct the heat through tubes 59 and fins 60 to the catalyst. For this purpose a material vaporizable at the temperature attained in the ring is most suitable. For example, a small amount of mercury or diphenyl oxide placed in the ring will be vaporized by the heat of the incoming gas, the vapor will pass into the tubes, and the heat in the vapor will be taken up by the fins and liberated to the catalyst, causing the vapor to condense and fall back into the ring as a liquid where it is against vaporized.

The apparatus is also provided with means for preventing damage should backfire occur. The means shown comprises a ball 61 held by spring 62 in a conical aperture 63, Fig. 7, formed in top 41, the outer end of the spring bearing against a yoke 64 connected to such top. The ball valve prevents passage of gas during normal operation, but should an explosion take place, it is forced outwardly, venting the explosion pressure to the atmosphere. This or other safety devices may be incorporated in the preceding embodiments.

In the use of this apparatus, raw hot gas passes into the nozzle from exhaust pipe 45, heating the catalyst in the manner described, and entraining air drawn through the filter bed. The gas-air mixture is discharged into chamber 48 and passes through the catalyst where the gas is converted into non-toxic, practically inodorous substances, and the purified gas passes into an annular passage 65 formed between screen 51 and shell 40, and thence to the atmosphere through openings 66 formed in top 41.

When used with stationary engines, this form of apparatus is usually in an upright position. In time the filter medium and catalyst may tend to pack down, and in order to prevent the air and gas from passing through the free spaces formed by such compacting, and thus being inefficiently treated, annular baffles 67 and 68 are arranged in the catalyst and air chambers, respectively, these baffles forcing the air and raw gas to pass downwardly through the respective treating materials.

In this form, and in the modification first described, the entire apparatus is removed when the catalyst has become incapable of further oxidation, and a new one substituted, or the apparatus may be repacked with fresh catalyst. In the form shown in Figs. 4 to 6, only the canister is removed in such a contingency, the connection between the fitting and motor not being disturbed.

This invention is not directed toward the use of any particular catalyst. A number of oxidizing catalysts for use in converting carbon monoxide to dioxide, or for oxidizing hydrocarbon gases are well known. Because of the high content of water vapor in internal combustion engine exhaust gas the catalyst must be maintained during use above the boiling point of water, to prevent condensation of moisture on it. Also, the large amount of oxidizable hydrocarbons and carbon monoxide in such gas makes necessary the use of a highly active catalyst, which is capable of efficiently operating at the high temperatures generated by the reactions. These restrictions are such that the known catalysts referred to may not all be suitable for this application. However, although the catalyst forms no part of this invention, nickel or cobalt oxides, manganese dioxide, or ferric oxide, when in catalytically active condition are suitable for use under these conditions. In order to present as large a gas-catalyst contact surface as possible, it is preferred to support the catalyst on a suitable carrier disposed in the catalyst chambers in the path of the gas. It is desirable to retard the flow of the gas through the catalyst in order to prolong its contact therewith, but the manner of disposing this material should be such that the increase in resistance to gas flow does not interfere with efficient operation of the engine.

In the operation of the apparatus with a suitable catalyst, it is necessary to so operate as to prevent condensation of water on the catalyst. This is accomplished in part by connecting the apparatus as close to the engine as practicable, and by operating with the catalyst at a temperature such that condensation will not take place. Of course, some water vapor condenses from the residual gas left in the chambers when the engine is shut off, and for this reason the catalyst should be heated to drive off the condensed moisture and to bring it up to operating temperature when the engine is started. These and other factors are provided for by the automatic control described.

The apparatus provided by the invention is compact, light in weight, and may be installed without changing present engine design. It is fully automatic in operation, and this feature is secured without the use of complex or delicate mechanism. The apparatus is simple in construction, and, considering its purpose, inexpensive. It effectively destroys the carbon monoxide toxicity of exhaust gas, and also renders such gas odorless, or practically so.

Other means of heating the catalyst, and other modifications of construction are shown in two copending applications, Serial Numbers 331,866 and 331,867, filed by me of even date herewith.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. Apparatus for catalytically purifying exhaust gas, comprising a canister provided with an inlet for raw gas and an outlet for purified gas, an oxidizing catalyst disposed in said canister in the path of said raw gas, and means for indirectly heating the catalyst from the raw gas prior to contact therewith.

2. Apparatus for catalytically purifying exhaust gas, comprising a canister provided with an inlet for raw gas and an outlet for purified gas, an oxidizing catalyst disposed in said canister in the path of said raw gas, and heat conducting means in said inlet associated with the catalyst for indirectly heating the catalyst from the raw gas prior to its contact with the catalyst.

3. Apparatus for catalytically purifying exhaust gas, comprising a canister provided with an inlet for raw gas and an outlet for purified gas, an oxidizing catalyst disposed in said canister in the path of said raw gas, and metallic heat conducting members disposed in said inlet and extending to a portion of the catalyst for indirectly heating the catalyst by conduction from the raw gas.

4. Apparatus for catalytically purifying exhaust gas, comprising a canister provided with an inlet for raw gas and an outlet for purified gas, an oxidizing catalyst disposed in said canister in the path of said raw gas, means for indirectly heating the catalyst from the raw gas prior to its contact with the catalyst, and means for admixing air in a continuous stream with said gas prior to contact with the catalyst.

5. Apparatus for catalytically purifying exhaust gas, comprising a canister provided with an inlet for raw gas and an outlet for purified gas, an oxidizing catalyst disposed in said canister in the path of said raw gas, heat conducting means in said inlet for transferring heat from said raw gas to the catalyst prior to its contact with the catalyst, and means associated with the inlet for admixing air with said gases subsequent to contact with said heat conducting means but prior to contact with the catalyst.

6. Apparatus for catalytically purifying internal combustion engine exhaust gas, comprising a canister provided with an inlet for raw gas and an outlet for purified gas, an oxidizing catalyst disposed in said canister in the path of the gas, heat-conducting means associated with said inlet and catalyst for transferring heat from said raw gas to the catalyst prior to contact of the gas with the catalyst, and an aspirating nozzle in said inlet for entraining air by flow of said gas.

7. Apparatus for catalytically purifying internal combustion engine exhaust gas, comprising a canister provided with an inlet for raw gas and an outlet for purified gas, an oxidizing catalyst disposed in said canister, a multi-stage aspirating nozzle in said inlet for entraining air by flow of the raw gas, means disposed in said inlet for transferring heat by conduction from said gas to the catalyst prior to its contact therewith, and means for filtering air associated with said nozzle.

8. Apparatus for catalytically purifying internal combustion engine exhaust gas, comprising a sheet metal canister having a longitudinally disposed air duct and an annular elongate catalyst chamber surrounding said duct and tapering toward it at one end, an oxidizing catalyst disposed in said chamber, an inlet for raw gases surrounding said tapered portion, a plurality of heat-conducting fins in said inlet and connected to said tapered portion for heating said catalyst by conduction from said gas, and a multi-stage aspirating nozzle disposed in said inlet for entraining air upon passage of raw gas through the nozzle.

In testimony whereof, I sign my name.

CONSTANT J. KRYZANOWSKY.